Jan. 13, 1970     P. D. KASPAR ET AL     3,489,154
COMPOSITE SHEET MATERIAL AND GARMENTS MADE THEREFROM
Original Filed Feb. 16, 1968     2 Sheets-Sheet 1
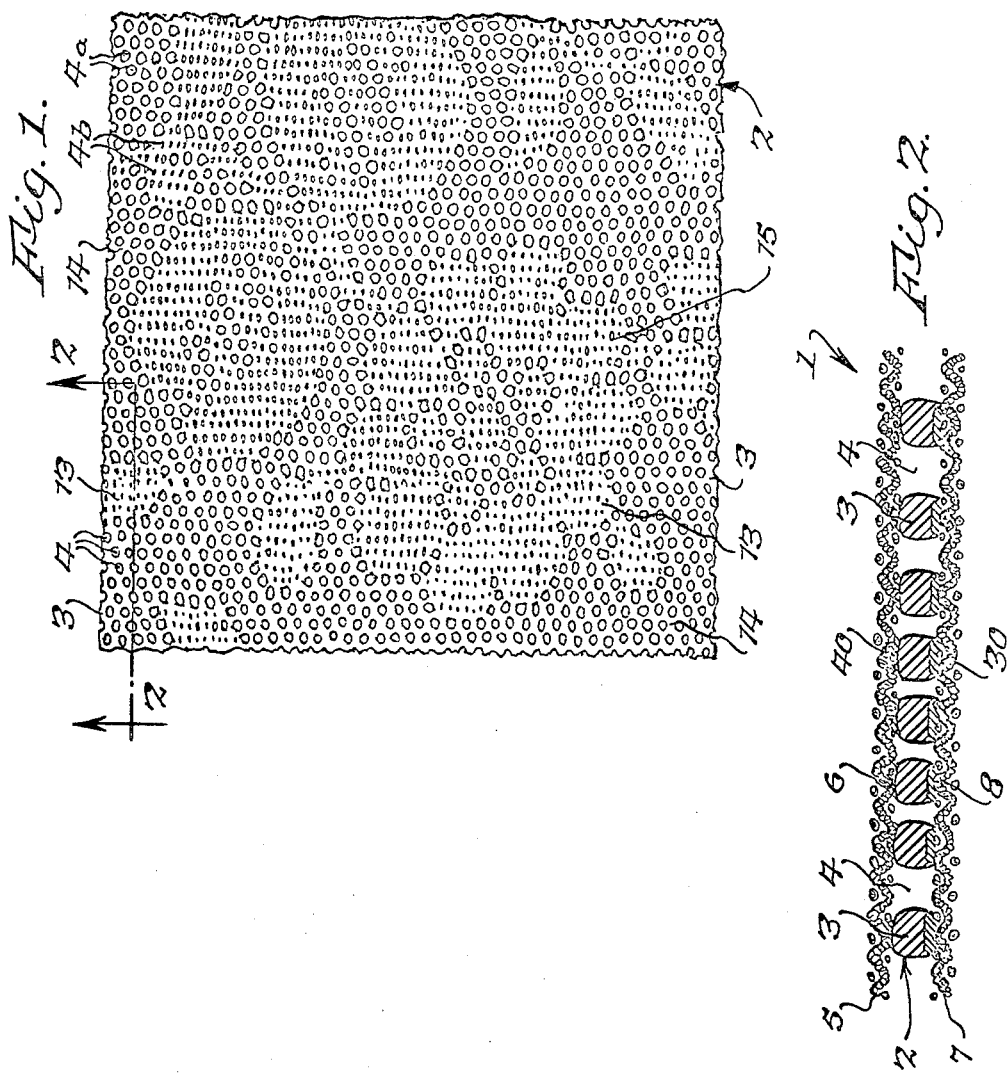
INVENTOR.
PAUL E. AMBROSE
PETER D. KASPAR

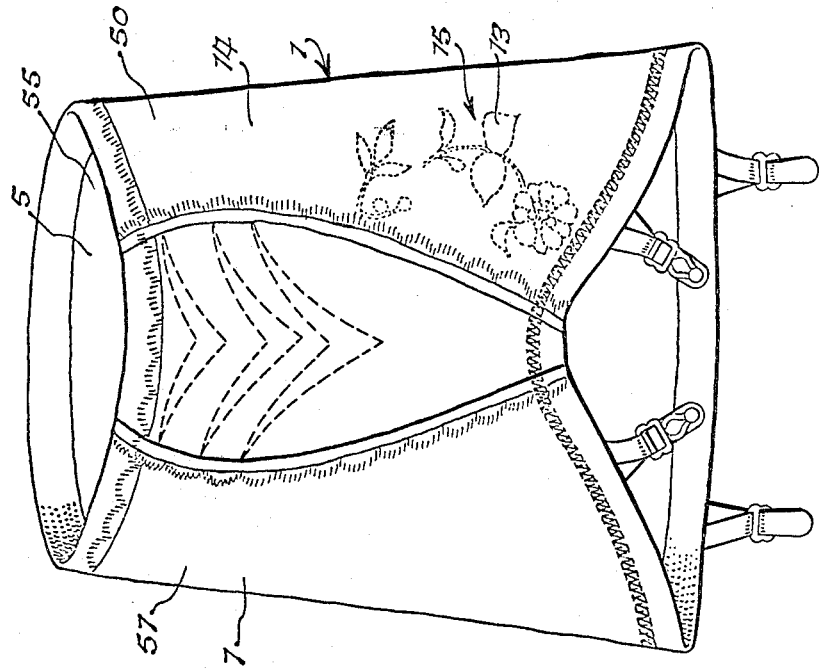
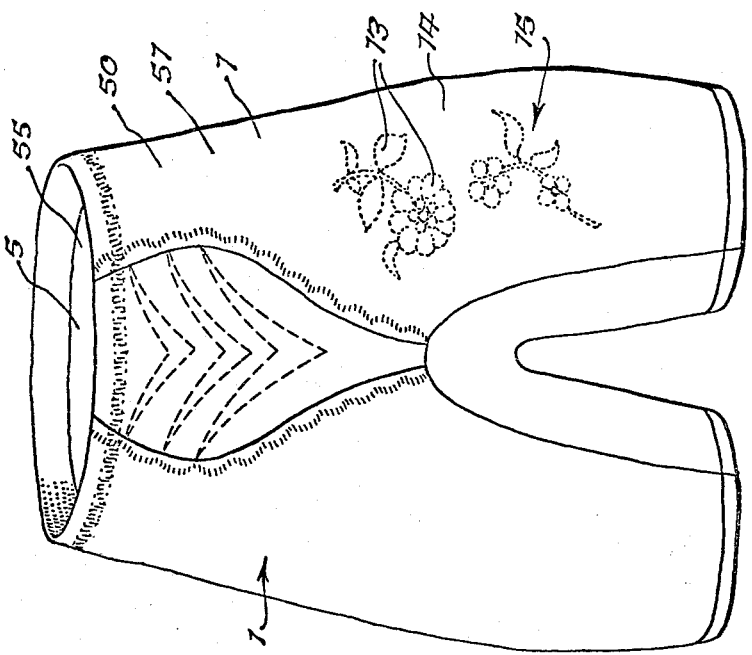
INVENTOR.
PAUL E. AMBROSE
PETER D. KASPAR

United States Patent Office 3,489,154
Patented Jan. 13, 1970

3,489,154
COMPOSITE SHEET MATERIAL AND
GARMENTS MADE THEREFROM
Peter D. Kaspar and Paul E. Ambrose, Dover, Del., assignors to International Playtex Corporation, New York, N.Y., a corporation of Delaware
Continuation of application Ser. No. 706,066, Feb. 16, 1968, which is a continuation-in-part of application Ser. No. 428,071, Jan. 26, 1965. This application Apr. 8, 1969, Ser. No. 820,044
Int. Cl. A41c 1/04
U.S. Cl. 128—521          19 Claims

ABSTRACT OF THE DISCLOSURE

A composite sheet material comprising a porous, laminated stretch material, and garments made therefrom, e.g., foundation garments or the like. The laminated stretch material includes a thin foraminous inner elastomeric layer which is surface-bonded on its opposite surfaces to outer fabric layers, at least one of which is a thin stretch fabric. The laminate has a predetermined stretch characteristic which is jointly determined by the characteristics of its composite layers. The inner layer may have a desired configuration which is imparted and delineated to the outer surface(s) of the laminate.

CROSS-REFERENCES TO RELATED APPLICATIONS

This application is a continuation of copending application Ser. No. 706,066, filed Feb. 16, 1968. The latter application was, in turn, a continuation-in-part of copending application Ser. No. 428,071, filed Jan. 26, 1965.

The composite sheet material of the present invention may be manufactured in accordance with the techniques disclosed in the aforesaid parent applications, such as the method and apparatus disclosed in further copending application Ser. No. 705,210, filed Feb. 13, 1968 in the name of Peter D. Kaspar and owned by the assignee of this invention.

BACKGROUND OF THE INVENTION

Field of the invention

The present invention relates to an improved composite sheet material which is particularly adapted for use in seamed body-constricting garments, such as girdles, brassieres, men's support briefs, or other foundation garments; swim suits, swim caps, stretch slacks, socks or the like. It further relates to such garments per se.

Description of the prior art

Porous rubber girdles or other foundation garments made from foraminous layers constituted of deposited latices or the like have had wide customer acceptance. The spacing of the individual holes within the foraminous elastomeric layer determines the "breathability" or porosity of the layer, while the configuration of the overall array of such holes determine the strength of the material as well as appearance. Numerous attempts have previously been made to improve such materials to provide greater or more consistent porosities, appropriate strength, modulus and other desirable characteristics. The primary difficulty previously encountered has involved the manner of achieving such results in a durable material for garment use.

One composite material useful for the above purposes in seamed girdles and other foundation garments is more fully shown and described in the aforesaid copending application Ser. No. 428,071, filed Jan. 26, 1965. The material disclosed therein comprises an elastomeric foraminous layer, laminated on one surface to a stretch fabric and flocked on its opposite surface.

It is a particular object of the present invention to provide an improved composite material for foundation or other body-constricting garments which exhibits improved strength and wear-resistance characteristics, and which may be made into garments which are durable, comfortable to wear and attractive in appearance.

Other objects and advantages of the invention will be apparent from the following detailed description of the invention, taken together with the accompanying drawings.

SUMMARY OF THE INVENTION

We have found that improved composite sheet materials for use in body-constricting garments are provided by a porous laminate comprising a thin foraminous inner layer surface-bonded on its opposite surfaces to outer fabric layers, at least one of which is a thin stretch fabric which, when bonded to the inner layer, limits the stretch of the laminated material to a predetermined stretch. The elongation of the foraminous layer, which comprises a suitable elastomeric substance, is thus restricted by the outer stretch fabric layer or layers, the stretch material desirably preventing the foraminous layer from stretching to its ultimate elongation during ordinary use and thus increasing the strength and wear-life of the garments fashioned from the porous laminate. The composite material thus provided is both strong and durable, comfortable to the touch, and suitably exhibits an esthetically pleasing appearance.

In particular, in accordance with one feature of the invention, the foraminous inner layer of the porous laminate has a desired configuration, e.g., a lace-like pattern, with the structural characteristics of one or both of the outer fabric layers of the laminate and foraminous inner layer being so interrelated that such configuration of the foraminous layer is imparted and delineated to the outer surface(s) of such fabric layer or layers. A wide range of designs may thus be provided, utilizing a foraminous layer incorporating holes which may be of uniform size and regularly spaced, or which may widely vary in density to define highly openwork reproductions of lace fabrics.

The predominant elasticity for providing the desired degree of control in garments made from the composite material is obtained from the inner foraminous layer. Thus, this layer will return the garment to its original unstretched condition after repeated or constant stress. In order to prevent the development of cracks in, or rupture of, the foraminous inner layer, it is necessary to prevent that layer from approaching its ultimate elongation. This is achieved by utilizing a stretch fabric or fabrics which, when bonded to the foraminous inner layer, provide a predetermined stretch limit less than the ultimate elongation of such layer before bonding. Thus the inner foraminous layer and outer stretch fabric or fabrics uniquely coact to provide a composite laminate providing the desired modulus and necessary strength and wear-resistance, as well as the comfort characteristics necessary for use in foundation garments or the like.

BRIEF DESCRIPTION OF THE DRAWINGS

FIGURE 1 is an enlarged plan view of the inner foraminous layer of the composite material of this invention, having a lace-like configuration;

FIGURE 2 is a sectional view showing the porous, composite laminate incorporating the inner foraminous layer of FIGURE 1 with first and second outer stretch fabric layers laminated to its opposite surfaces;

FIGURE 3 is a typical pantry girdle made from the composite material of this invention; and FIGURE 4 is a typical open girdle made from the composite material.

PREFERRED EMBODIMENTS OF THE INVENTION

Referring initially to FIGURES 1 and 2 of the drawings, the composite material 1 of this invention comprises an inner foraminous layer 2 incorporating a plurality of continuous interconnected elements 3 defining a plurality of holes 4 of varying shapes and sizes, a first fabric layer 5 laminated to a first surface 6 of the foraminous material, and a second fabric layer 7 laminated to the second, opposite surface 8 of such material to form the 3-layer laminate hereof.

The foraminous inner layer 2 is constituted of an elastomeric substance such, for example, as natural rubber or any other natural or synthetic elastomer possessing elastic properties rendering the same suitable for use in body-constricting garments such as girdles or other foundation garments, or other articles of apparel. Preferably, the elastomeric material comprising the foraminous layer is a deposited latex, viz., a material deposited from an aqueous dispersion of rubber or other elastomer.

Layer 2, as noted, is "foraminous," viz., a perforated or apertured sheet provided with a multiplicity of the holes 4 extending through the sheet, defined by the continuous interconnected elements 3. Such elements impart strength to the layer and make the same self-sustaining, while the plurality of holes defined therebetween make the layer porous.

The particular size and shape of the individual holes 4, or the distribution of such holes throughout the foraminous layer is constituted independent of the openings in the thin stretch fabrics 5, 7 and the corresponding configuration of the interconnected elements defining the same, is similarly independent of the openings in the stretch fabrics and is so chosen as to provide optimum strength, "openness" of the material, and comfort when made into a body-constricting garment. Suitably, the interconnecting elements 3 are as small as .010 inch in width, and preferably of the order of .020 inch. The holes provided therebetween are similarly of the order of .02 inch across, their aggregate array defining open areas on the opposite surfaces of the foraminous layer which may vary from a mere fraction, e.g., a few percent, of the total surface area of the layer, up to 50% or more thereof. In one form of the invention the open area constitutes approximately 10 to 30 percent of the surface area of the foraminous layer.

The foraminous layer 2 may suitably be about .020 inch in thickness, and have an ultimate elongation (before bonding) of more than 800 percent its original length or width, before rupture or failure.

It has been found feasible, when utilizing a foraminous layer of such gauge and elasticity, and incorporating the above-noted degree of openness, to obtain an optimum surface-to-mass ratio of the interconnecting elements of the elastomeric material thereof. Such a ratio represents that configuration at which the strength of the several interconnecting elements of the foraminous layer approaches a maximum value while the aggregate surface area of such elements approaches a minimum value, thereby defining a layer exhibiting the greatest openness for a given modulus.

In the configuration of the foraminous layer illustrated in FIGURE 1, the interconnecting elements 3 and intermediate holes 4 are arranged in a predetermined manner to form substantially solid areas 13 and substantially open areas 14. The substantially solid areas may be in the form of simulated objects, such as flowers, and may be so arranged relative to the substantially open areas as to form a non-symmetrical lace-like configuration or design 15. The substantially solid areas preferably range from two inches in width (the greatest dimension) and one inch in length (transverse to the greatest dimension) to .050 inch in width and .050 inch in length.

The substantially open areas may incorporate about 400 of the holes 4 per square inch. On the other hand, the substantially solid areas 13 of the foraminous layer may incorporate only from about 10 to 100 of such holes per square inch. It will thus be seen that even the substantially solid areas of the elastomeric layers may have some porosity.

The foraminous layer is laminated to fabric layers 5 and 7 (FIGURE 2), at least one and desirably both of which are knitted stretch fabrics as disclosed in the aforesaid parent application Ser. No. 706,066. Alternatively, one of the outer fabric layers may comprise a coating of flock bonded to the foraminous layer as described in the aforesaid application Ser. No. 428,071.

Making further reference to application Ser. No. 706,066 and as described below, each of the outer fabric layers may have a thickness less than the thickness of the foraminous layer; thus, in the instant embodiment, each of the fabric layers may, for example, have an average thickness of about 0.012 inch. On the other hand, and as disclosed in application Ser. No. 428,071, the inner foraminous layer may have a thickness no greater than the thickness of the stretch fabric; thus, in the embodiment there described, the foraminous layer may have a thickness of from about 0.010 to about 0.015 inch and the stretch fabric an average thickness of about 0.020 inch. By thus varying the thickness of the elastomeric layer, it is possible to impart a desired degree of figure-shaping power to the garment incorporating the porous laminate.

Stretch fabrics useful in the composite material hereof may, for example, be circular knit fabrics capable before bonding of stretching at least 160% in one direction and 240% in the direction transverse thereto.

Examples of yarns which may be so employed to produce stretch fabrics suitable for use in the composite materials hereof are those which are commercially available as "Helanca" yarn. Such material has considerable bulk, a high degree of stretch, and exhibits rapid recovery from its stretched or elongated condition. In one preferred embodiment, the stretch fabrics may be provided of a highly stretchable nylon fabric, "Armtex No. 1320," having a basis weight of approximately 2.0 ounces per square yard and a thickness of about .012–.013 inch. Such material is sufficiently strong and yet sheer such that the design of the foraminous layer 2 is imparted and delineated to the outer surface thereof, as described hereinafter.

Fabric layers 5 and 7 are bonded to the foraminous layer 2 by means of first and second adhesive layers 40 and 30, respectively. The fabric layers span the respective ends of the holes 4 in the foraminous layer and are bonded by the adhesive to the elastomeric material of the surfaces of the elements defining and surrounding the several holes.

The adhesive, which may comprise a deposited latex, is applied to the opposite surfaces of the foraminous layer in relatively thin strata in order that only limited portions, suitably about 20%, of the respective stretch fabrics are penetrated by the latex during lamination. Employing fabric layers having average thicknesses of about 0.012 inch, adhesive bonding layers 40 and 30 having average depths of about .0025 inch may conveniently be so utilized. By thus penetrating only a small fraction of the total depth of each stretch fabric a composite material is provided in which the bonded stretch fabric retains the major portion of its unbonded stretchability. Such surface bond provides the desired laminate stretch characteristic, while retaining the porosity of fabric layers 5 and 7.

The composite material thus defined, like the foraminous layer and the stretch fabric(s) prior to lamination, may be stretched in all directions. Thus a typical laminated material incorporating the elements described hereinabove may be stretched from a minimum of 100% to 150% in the machine direction and from 130% to 205% in the direction transverse thereto. When such material is incorporated in a body-constricting garment, such as the girdles illustrated in FIGURES 3 and 4, its stretch characteristics may be of the order of at least 100% in the lengthwise direction of the girdle and at least 130% in the girthwise thereof.

The use of the composite material of this invention in a body-constricting garment is illustrated by the panty girdle 50 and open girdle 50 shown in FIGURES 3 and 4, respectively. The girdle patterns required to make such panty or open girdles may be readily cut from the composite material described hereinabove and thereafter sewed into the desired garments employing one or more seams, in the conventional manner. Thus, the type of girdle, foundation garment, or other body-constricting garment which may be made employing the composite materials of this invention is limited only by the patterns which may be cut from such materials and incorporated in the desired garments.

In making the panty girdle or open girdle of FIGURES 3 and 4, seams are sewed generally vertically to form a front panel which, if desired, may comprise either the elastic composite material of the present invention or an inelastic fabric. The side and rear portions of the girdle comprise the elastic composite material 1. When such material is also utilized in the front panel, a fabric insert may be provided in the abdominal area. Finally, an elastic binding strip is provided about the waist opening and, if desired, about the bottom edge of the girdle.

When the composite material is thus sewn into the garments illustrated, it defines several stretch panels each of which includes a fabric inner ply 55 (corresponding to stretch fabric layer 5 of the composite material) and a fabric outer ply 57 (corresponding to stretch fabric layer 7 of such material). Such stretch panels are capable of two-way stretch with maximum elongations of, for example, 190% in the vertical direction, and 260% in the horizontal direction. The foraminous inner layer of each panel exhibits the predominant elasticity for returning the garment to its original shape after stretch deformation. Stated another way, it is this desire to return to a set shape that provides the molding and holding power of the material. The outer stretch fabric plies of the material serve to limit the stretch of the garment to prevent stretch of the inner foraminous layer to ultimate elongation.

The inner plies 55 of the stretch panels of each girdle contact the skin of the wearer, moving or stretching therewith as she moves about. Such improves both comfort and figure control imparted by the garment, since the composite material does not bind or restrict body movement. The outer fabric plies, on the other hand, impart a soft, smooth "hand," totally unlike rubber or other elastomer, to the outer surface of the girdle. Such makes the foundation garment more pleasant to handle, and helps to avoid catching the outer clothing, particularly a light summer dress, on the outer surfaces thereof.

As further illustrated in FIGURES 3 and 4, the substantially solid areas 13 and substantially open areas 14 of each foraminous layer are imparted and delineated to the outer surfaces of the fabric plies 57 of the girdles shown. The outer surfaces of the stretch panels thus exhibit the characteristics of the stretch fabric layer 7, in combination with the underlying configuration of the foraminous inner layer 2. In the embodiments illustrated the lace-like configuration or design 15 is thus imparted to the stretch panels of the respective garments, providing the girdles illustrated with desirable characteristics.

A better understanding of the composite sheet material and seamed body-constricting garments of the present invention may be obtained from the following summary of various of the improved characteristics thereof:

(1) Strength and elasticity

The composite material of the invention possesses adequate strength and elasticity for foundation garments and yet is both thinner and lighter than previous materials of comparable strength and control. Thus, the foraminous layer of the laminate may be thinner and lighter and may possess a greater open area (and hence greater porosity) than prior rubber layers employed in foundation garments, because of its lamination with the reinforcing stretch fabric layer or layers. Further, since the outer fabric layers are securely bonded to the foraminous inner layer they are returned, along with such layer, to their original shape prior to stretch or deformation. The several layers thus coact to provide adequate figure-constricting strength without material risk of rupture or failure of the individual plies during normal use of the garment incorporating such material.

By such construction, the stretch fabric or fabrics reinforce the foraminous layer and act as an anti-rupture or safety device preventing tears, splits and punctures by limiting the stretch of such layer to values fully suitable for the intended use thereof, but well within the ultimate elongation of the foraminous material prior to bonding. In the case of girdles, use of the present laminate may also improve the garment strength in the region of the garter attachments. The risk of failure of the individual layers is thus minimized, even at the high local stresses encountered when pulling the girdle or other body-constricting garment on or off.

Evidence of the superior tensile strength exhibited by the composite sheet material of the present invention is further afforded by the following experimental data:

TABLE I.—COMPARATIVE TENSILE STRENGTH OF VARIOUS SHEET MATERIALS
[In pounds per inch]

| Material tested | Strength | |
| --- | --- | --- |
| | Length | Width |
| Stretch fabric layer only | 18 | 12 |
| Foraminous layer only | 10 | 11 |
| Foraminous layer laminated to single stretch fabric layer | 19 | 18 |
| Foraminous layer laminated on one surface to stretch fabric layer and flocked on its opposite surface | 21 | 20 |
| Foraminous layer laminated on both its opposite surfaces to stretch fabric layers (the composite material of this invention) | 51 | 36 |

(2) Durability

The novel laminate hereof additionally provides excellent resistance to mechanical fatigue, viz., to those changes in the properties of the material resulting from the prolonged application of mechanical stress or deformation. Foundation garment materials are subjected to various types of fatigue including creep and stress-relaxation resulting from constant stresses or deformations, as well as flex-cracking and crack-growth. Flex-cracking refers to the formation of cracks and consequent surface failure usually attributable to repeated cycles of deformation, such as the longation to which girdle materials, for example, are repeatedly subjected.

The reinforcing action of the stretch fabric layer or layers of the porous laminate of the invention imparts good flex-crack and crack-growth resistance to the composite material hereof, samples of such material exhibiting virtually no flex-cracking after as much as 40 hours of continuous flexing. Moreover, by covering the surfaces of the foraminous layer, the reinforcing stretch fabric(s) decrease surface deterioration or "aging" of the elastomeric material and minimize damage resulting from flex-cracking of the foraminous layer, thus preserving the garment, even after prolonged wear.

The improved flex-life durability of the composite material and body-constricting garments made therewith is believed to be due to the reinforcing action of the outer stretch fabric layer, which limits the laminate to a predetermined stretch and thereby prevents the application of excessive stresses or strains to the foraminous layer. It appears that such tends to minimize crack growth in the numerous interconnected elements formed in the foraminous layer and thus preserves the strength and elasticity of the layer over prolonged periods of use.

(3) Attractive appearance

A further distinct advantage of the materials and garments of the present invention resides in their appearance to purchasers and wearers. As indicated hereinabove, the configuration of the inner foraminous layer of the porous laminate hereof is imparted and delineated to the outer surface of the stretch fabric layer or layers, the characteristics of the latter combining with the configuration of the foraminous sheet and the laminate thus exhibiting the composite characteristics of the stretch fabric layer(s) and the foraminous layer. By suitable arrangement of the hole configuration in the foraminous layer and the characteristics of the outer stretch fabric layer or layers, it is thus possible to impart, for example, a delicate net or lace-like appearance to the composite sheet material.

The reinforcing stretch fabric or fabrics facilitate the use of relatively thin foraminous layers which provide unusual decorative effects and yet which, because of such fabric reinforcement, nevertheless possess the desired mechanical strength, elasticity and durability. Moreover, the outer fabric layers of the composite laminate impart cloth-like characteristics to the laminate, which nevertheless retains the modulus of the inner rubbery layer.

(4) Porosity

It is important that girdles or other body-constricting garments be porous in order that air can reach the wearer's skin and perspiration can escape to the atmosphere to facilitate the wearer's coolness and comfort. The composite material of this invention possesses such porosity, the inner foraminous layer thereof possessing a high ratio of open areas in relationship to the solid areas thereof, and the outer stretch fabric or fabrics defining relatively open plies through which vapor or liquid transfer is readily achieved. Such relatively high degree of porosity can only be achieved, without material sacrifice in the strength, modulus and wear-resistance of the composite material, by the coaction of the several mutually reinforcing laminae.

The relatively high porosity of the material of this invention is further illustrated by the following experimental data:

TABLE II.—COMPARATIVE ABSORPTION OF VARIOUS SHEET MATERIALS

| Material tested: | Moisture absorbed (grams) |
| --- | --- |
| Light-weight foraminous layer only | 3.7 |
| Heavy-weight foraminous layer only | 5.4 |
| Foraminous layer laminated to single stretch fabric layer | 6.4 |
| Foraminous layer laminated on one surface to stretch fabric layer and flocked on its opposite surface | 13.0 |
| Foraminous layer laminated on both its opposite surfaces to stretch fabric layers (the composite material of this invention) | 20.0 |

(5) Integrity of shape

The essential function of any foundation garment is to define, control and support the shape of the wearer. For such purposes the garment material must have an inherent dimensional configuration to which it will substantially return, time and time again, after repeated or constant stress. Rubber, for example, possesses the indicated characteristic, whereas most fabrics, even partially elastic stretch fabrics do not. Such integrity of shape is imparted to the outer stretch fabric layer or layers of the composite sheet material of this invention by the inner foraminous layer thereof. Thus, upon release of a deforming force, the foraminous layer of the composite material will return to its former shape and, because of the secure surface bond between such layer and the outer fabrics of the laminate, will effect return of such laminae to their original conformation as well. Such is a desirable characteristic in girdles or other body-constricting garments.

(6) Body-constriction

An important characteristic of a material designed for use in girdles or other body-constricting garments is the ability of such material to conform the body to a desired shape. It is one of the advantages of the composite sheet material of this invention that, when utilized in the stretch panels of a girdle or a similar garment, it substantially matches the expansion and contraction of the wearer's skin and thus acts like a "second skin."

In general, girdles have some tendency to retain their original dimensions, particularly the longitudinal dimension in the back. Thus, when the wearer sits down the girdle tends to pull up across her skin at the bottom and down across her skin at the top. Conversely, when she stands up the girdle tends to hold back and become somewhat bunched and puckered.

On the other hand, the stretch characteristics of girdles incorporating the porous laminate hereof more nearly match the stretch characteristics of the wearer's skin and, surprisingly, exhibit the ability to anchor on and reach with the skin of the wearer as her body assumes different positions and dimensions when she stretches, sits down, or performs other movements.

Conformance of the garments of the invention to the wearer's skin is further insured by virtue of the fact that the porous laminate hereof lies flat and does not have a tendency to curl or twist. The flatness of the composite material further minimizes the possibility of wrinkling, and hence improves body conformance in addition to further enhancing the overall appearance of the composite material.

(7) Comfortable

It is, of course, important that a girdle or other body-constricting garment feel comfortable; hence, the constituent material of such a garment should be of a desirable texture where it contacts the wearer, whether the skin be wet or dry. Previous rubber girdles do not meet such requirement, in view of the sticky or tacky feel of rubber. On the other hand, the laminate of the invention possesses outer fabric layers which exhibit a smooth and soft feel or hand, thus being pleasing to the touch and, moreover, minimizing if not preventing "catching" of the outer surface of the foundation garment and consequent bunching or "riding up" when the wearer stands or sits.

Wearing comfort of garments incorporating the composite material of the invention is further enhanced by ths exceptional ability of such material to transport or wick body moisture to the outer surface of the garment where the moisture may be quickly evaporated. Such excellent wicking characteristic is obtained in part by the structure of and the yarns of the stretch fabric or fabrics and in part by the large proportion of holes provided in the foraminous inner layer of the material. The excellent water vapor transfer characteristics of the laminated material markedly improves the "coolness" of the girdle or other garment, by thus increasing the flow of moistuer from the wearer's skin through the garment. Hence, a rather heavy-control girdle of such material will be comfortable.

The structure of the porous laminate hereof further increases the ease with which the girdle or other body-constricting garment incorporating the same may be put on. Thus, the outer fabric layers of the laminate are bonded securely to the inner foraminous layer solely at the several interconnected elements of the latter. Such "spot bonding" permits the various laminae of the composite material to remain relatively free for unrestricted and progressive movement against the friction of the skin as the garment is "jockeyed" into wearing position on the body.

(9) Washable

The composite material of the invention may further be subjected to repeated washings without substantial discoloration or degradation of the laminate. Thus, for example, it has been experimentally determined that such material may be subjected to well above 50 wash cycles with no deleterious effects noted, the composite material still exhibiting a quite acceptable appearance after such testing.

(10) Economical

Foundation or other body-constricting garments may be quite economically manufactured from the composite materials of this invention. Such economies are possible by virtue of the fact that the novel laminate incorporates less elastomeric material than required for prior homogeneous rubber girdles (without, however, any decrease in the strength or elasticity thereof). Moreover, the composite material of the invention may be manufactured in continuous lengths and may be shipped in roll form, cut in accordance with any desired pattern, and sewed into a finished garment at any convenient manufacturing location. Such convenience factor facilitates the separate manufacture of the composite sheet material and shipment of the same to small garment manufacturers for the independent production of the desired end garments.

It will be apparent from the foregoing that the present invention markedly improves the basic characteristics which are desirable in composite sheet materials intended for use in seamed body-constricting garments, e.g., foundation garments and the like. Thus, girdles or other foundation garments incorporating the composite sheet material hereof combine the basic desired characteristics of control, comfort, coolness, and the ability to move with the natural stretch of the wearer's skin, with the high fashion appeal of a garment exhibiting a delicate lace-like or other desired configuration.

The embodiments of the invention in which an exclusive privilege or property is claimed are defined as follows:

1. A seamed body-constructing garment having at least a major portion of its area made of a porous laminated stretch material comprising a thin foraminous inner layer of an elastomeric substance surface-bonded on its opposite faces to outer fabric layers;
    at least one of the fabrics forming the outer fabric layers being a thin stretch fabric which, when bonded to said foraminous inner layer, limits the stretch of the laminated material to a predetermined stretch;
    the holes in said thin elastomeric inner layer constituted independent of the openings in the said thin stretch fabric outer layer that is surface bonded thereto;
    said foraminous inner layer having a desired configuration which is substantially independent of the openings in said stretch fabric; and
    the characteristics of at least one of said outer fabric layers being so structured that the desired configuration of the latter is imparted and delineated to the outer surface of the former with the configuration of the inner layer being presented at the outer surface of such fabric layer.

2. The seamed body-constricting garment of claim 1 wherein each of the fabrics forming said outer fabric layers is a thin stretch fabric, to provide first and second fabric layers;
    said first stretch fabric layer bonded to a first face of said inner layer, and said second stretch fabric layer bonded to the opposite second face of said inner layer;
    said inner layer having a substantial plurality of holes extending completely therethrough, with said holes having first and second ends at the opposite first and second faces of the inner layer;
    said first stretch fabric layer spanning across the first ends of each of said holes and bonded to the elastomeric material of said first face surrounding each of said holes; and
    said second stretch fabric layer spanning across the second ends of each of said holes and bonded to the elastomeric material of said second face surrounding each of said holes.

3. A porous laminated stretch material comprising a thin foraminous inner layer of an elastomeric substance surface-bonded on its opposite faces to outer fabric layers;
    at least one of the fabrics forming the outer fabric layers being a thin stretch fabric which, when bonded to said foraminous inner layer, limits the stretch of the laminated material to a predetermined stretch;
    the holes in said thin elastomeric inner layer constituted independent of the openings in the said thin stretch fabric outer layer that is surface bonded thereto;
    said foraminous inner layer having a desired configuration which is substantially independent of the openings in said stretch fabric; and
    the characteristics of at least one of said outer fabric layers being so structured that the desired configuration of the latter is imparted and delineated to the outer surface of the former with the configuration of the inner layer being presented at the outer surface of such fabric layer.

4. A porous laminated stretch material as set forth in claim 3, wherein each of said fabrics forming said outer fabric layers is a thin stretch fabric, and said desired configuration is imparted and delineated to the outer surfaces of each of said thin stretch fabrics.

5. The porous laminated stretch material of claim 3 wherein each of the fabrics forming said outer fabric layers is a thin stretch fabric, to provide first and second thin stretch fabric layers;
    said first stretch fabric layer bonded to a first face of said inner layer, and said second stretch fabric layer bonded to the opposite second face of said inner layer;
    said inner layer having a substantial plurality of holes extending completely therethrough, with said holes having first and second ends at the opposite first and second faces of the inner layer;
    said first stretch fabric layer spanning across the first ends of each of said holes and bonded to the elastomeric material of said face surrounding each of said holes; and
    said second stretch fabric layer spanning across the second ends of each of said holes and bonded to the elastomeric material of said second face surrounding each of said holes.

6. The porous laminated stretch material of claim 3 wherein said inner layer comprises a deposited latex.

7. The porous laminated stretch material of claim 3 wherein said inner layer has a thickness greater than the thickness of the thin stretch fabric.

8. The porous laminated stretch material of claim 7 wherein said inner layer has a thickness of the order of 0.020 inch and each of the fabrics forming said outer fabric layers is a thin stretch fabric having a thickness of the order of 0.012 inch.

9. A seamed body-constricting garment having at least a major portion of its area made of a porous laminated stretch material comprising a thin foraminous inner layer of an elastomeric substance surface-bonded on its opposite faces to outer fabric layers;

at least one of the fabrics forming the outer fabric layers being a thin stretch fabric which when bonded to said foraminous inner layer retains the major portion of its unbonded stretchability;

the holes in said thin elastomeric inner layer constituted independent of the openings in the said thin stretch fabric outer layer that is surface bonded thereto;

said thin stretch fabric having a predetermined stretch for limiting the stretch of the laminated material, with the foraminous inner layer providing the predominant elasticity for returning the laminate to its unstretched condition; and said foraminous inner layer having an unbonded ultimate elongation which exceeds the stretch limit of the laminated material, with the bonded stretch fabric reinforcing the foraminous inner layer and preventing stretch thereof to such ultimate elongation.

10. The seamed body-constricting garment of claim 9 wherein said foraminous inner layer comprises a deposited latex.

11. The seamed body-constricting garment of claim 9 wherein said inner layer has a thickness no greater than the thickness of the thin stretch fabric.

12. The seamed body-constricting garment of claim 9 wherein each of the fabrics forming said outer fabric layers is a thin stretch fabric, to provide first and second stretch fabric layers;

said first stretch fabric layer bonded to a first face of said inner layer, and said second stretch fabric layer bonded to the opposite second face of said inner layer;

said inner layer having a substantially plurality of holes extending completely therethrough, with said holes having first and second ends at the opposite first and second faces of the inner layer;

said first stretch fabric layer spanning across the first ends of each of said holes and bonded to the elastomeric material of said first face surrounding each of said holes; and said second stretch fabric layer spanning across the second ends of each of said holes and bonded to the elastomeric material of said second face surrounding each of said holes.

13. The seamed body-constricting garment of claim 12 wherein each of said first and second stretch layers has a thickness less than the thickness of said inner layer.

14. The seamed body-constricting garment of claim 13 wherein said inner layer has a thickness of the order of 0.020 inch and each of the fabrics forming said outer fabric layers is a thin stretch fabric having a thickness of the order of 0.012 inch.

15. A porous laminated stretch material comprising a thin foraminous inner layer of an elastomeric substance surface-bonded on its opposite faces to outer fabric layers;

at least one of the fabrics forming the outer fabric layers being a thin stretch fabric;

the holes in said thin elastomeric inner layer constituted independent of the openings in the said thin stretch fabric outer layer that is surface bonded thereto;

said thin stretch fabric having a predetermined stretch for limiting the stretch of the laminated material, with the foraminous inner layer providing the predominant elasticity for returning the laminate to its unstretched condition;

said foraminous inner layer having an unbonded ultimate elongation which exceeds the stretch limit of the laminated material, with the bonded stretch fabric reinforcing the foraminous inner layer and preventing stretch thereof to such ultimate elongation;

said foraminous inner layer having a desired configuration which is substantially independent of the openings in said stretch fabric; and the characteristics of at least one of said outer fabric layers being so structured that the desired configuration of the latter is imparted and delineated to the outer surface of the former with the configuration of the inner layer being presented at the outer surface of such fabric layer.

16. A porous laminated stretch material as set forth in claim 15, wherein each of said fabrics forming said outer fabric layers is a thin stretch fabric, and said desired configuration is imparted and delineated to the outer surfaces of each of said thin stretch fabrics.

17. A seamed body-constricting garment having at least a major portion of its area made of a porous laminated stretch material comprising a thin foraminous inner layer of an elastomeric substance surface-bonded on its opposite faces to outer fabric layers;

at least one of the fabrics forming the outer fabric layers being a thin stretch fabric;

the holes in said thin elastomeric inner layer constituted independent of the openings in the said thin stretch fabric outer layer that is surface bonded thereto;

said thin stretch fabric having a predetermined stretch for limiting the stretch of the laminated material, with the foraminous inner layer providing the predominant elasticity for returning the laminate to its unstretched condition;

said foraminous inner layer having an unbonded ultimate elongation which exceeds the stretch limit of the laminated material, with the bonded stretch fabric reinforcing the foraminous inner layer and preventing stretch thereof to such ultimate elongation;

said foraminous inner layer having a desired configuration which is substantially independent of the openings in said stretch fabric; and the characteristics of at least one of said outer fabric layers being so structured that the desired configuration of the latter is imparted and delineated to the outer surface of the former with the configuration of the inner layer being presented at the outer surface of such fabric layer.

18. A lace-like laminated stretch material comprising:

a thin foraminous inner layer of an elastomeric substance;

first and second thin stretch fabric outer layers surface-bonded to the opposite faces of said foraminous inner layer;

the holes in said thin elastomeric inner layer constituted independent of the openings in the said thin stretch fabric outer layers that are surface bonded thereto;

said stretch fabric outer layers, when bonded to said foraminous inner layer, limiting the stretch of the laminated stretch material to a predetermined stretch;

said foraminous inner layer including means for defining a lace configuration which is substantially independent of the openings in said stretch fabrics; and said lace configuration being imparted and delineated to the outer surface of at least one of the outer stretch fabric layers, with said outer surface having the characteristics of the one stretch fabric layer in combination with the underlying lace configuration of the foraminous inner layer.

19. A seamed girdle of the type to be worn about the lower torso of the body and provide a desired degree of body constriction and contour conformance;

said seamed girdle having at least a substantial portion of its area made of a porous laminated stretch material comprising a thin foraminous inner layer of an elastomeric substance surface-bonded on its outer faces to first and second thin stretch fabric outer layers;

the holes in said thin elastomeric inner layer constituted independent of the openings in the said thin stretch fabric outer layers that are surface bonded thereto;

said inner layer having an unbonded ultimate elongation which exceeds the stretch limit of the laminated material, with the bonded stretch fabric layers reinforcing the foraminous inner layer and preventing stretch thereof to such ultimate elongation;

said stretch fabric layers operatively combining their stretch characteristics with said inner layer to provide a predetermined bonded stretch characteristic wherein each of the said stretch fabrics retain a major portion of its unbonded stretchability; and said bonded stretch characteristic substantially conforming with the expansion and contraction of the wearer's body, while maintaining the desired degree of body constriction and contour conformance, as the body assumes different positions.

References Cited

UNITED STATES PATENTS

| | | | |
|---|---|---|---|
| 2,004,110 | 6/1935 | Head | 161—76 |
| 2,165,099 | 7/1939 | Hansen | 264—309 |
| 2,183,380 | 12/1939 | Hurt | 161—66 |
| 2,184,153 | 12/1939 | Schwartz | 117—104 |
| 2,219,829 | 10/1940 | Teague et al. | 117—7 |
| 2,312,200 | 2/1943 | Teague et al. | 161—66 |
| 2,404,758 | 7/1946 | Teague et al. | 161—73 |
| 2,817,597 | 12/1957 | Alderfer | 117—10 |
| 3,138,162 | 6/1964 | Serra | 128—580 |
| 2,021,352 | 11/1935 | Eustis | 161—79 |

FOREIGN PATENTS 448,184    5/1936    Great Britain.

ADELE M. EAGER, Primary Examiner

U.S. Cl. X.R.

128—539, 580; 161—66, 79

PO-1050
(5/69)

UNITED STATES PATENT OFFICE
CERTIFICATE OF CORRECTION

Patent No. 3,489,154        Dated January 13, 1970

Inventor(s) P.D. Kaspar, et al

It is certified that error appears in the above-identified patent and that said Letters Patent are hereby corrected as shown below:

1) Column 6, line 59: change "longation" to read -- elongation --

2) Column 8, line 68: change "moistuer" to read -- moisture --

3) Column 9, line 48: change "constructing: to read -- constricting --

4) Column 11, line 32: change "substantially: to read -- substantial --

SIGNED AND SEALED
AUG 25 1970

(SEAL)
Attest:

Edward M. Fletcher, Jr.
Attesting Officer

WILLIAM E. SCHUYLER, JR.
Commissioner of Patents